(12) United States Patent
Parr et al.

(10) Patent No.: US 11,684,855 B2
(45) Date of Patent: *Jun. 27, 2023

(54) SYSTEM AND METHOD FOR VIRTUAL NAVIGATION IN A GAMING ENVIRONMENT

(71) Applicant: TAKE-TWO INTERACTIVE SOFTWARE, INC., New York, NY (US)

(72) Inventors: Simon Parr, Edinburgh (GB); David Hynd, Dunfermline (GB)

(73) Assignee: TAKE-TWO INTERACTIVE SOFTWARE, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/357,683

(22) Filed: Jun. 24, 2021

(65) Prior Publication Data

US 2021/0316220 A1 Oct. 14, 2021

Related U.S. Application Data

(63) Continuation of application No. 16/393,365, filed on Apr. 24, 2019, now Pat. No. 11,071,916.

(51) Int. Cl.
*A63F 13/56* (2014.01)
*A63F 13/35* (2014.01)

(52) U.S. Cl.
CPC .............. *A63F 13/56* (2014.09); *A63F 13/35* (2014.09)

(58) Field of Classification Search
CPC .................................. A63F 13/56; A63F 13/35
See application file for complete search history.

(56) References Cited

U.S. PATENT DOCUMENTS

| | | |
|---|---|---|
| 5,608,635 A | 3/1997 | Tamai |
| 5,991,688 A | 11/1999 | Fukushima et al. |
| 6,118,389 A | 9/2000 | Kamada et al. |
| 8,478,901 B1 | 7/2013 | Poursohi et al. |
| 8,560,224 B2 | 10/2013 | Vu et al. |
| 8,626,430 B2 | 1/2014 | Dicke et al. |
| 10,033,624 B2 | 7/2018 | Rolf et al. |
| 10,406,437 B1 * | 9/2019 | Scheurwater ........... A63F 13/95 |
| 2007/0198178 A1 | 8/2007 | Trimby et al. |
| 2007/0276709 A1 | 11/2007 | Trimby et al. |
| 2009/0043796 A1 | 2/2009 | Sauermann |
| 2009/0259394 A1 | 10/2009 | Vu et al. |
| 2010/0082235 A1 | 4/2010 | Dicke et al. |
| 2013/0328937 A1 | 12/2013 | Pirwani et al. |
| 2015/0066368 A1 | 3/2015 | McKenzie et al. |
| 2017/0269605 A1 * | 9/2017 | Myers .................. G05D 1/0274 |
| 2019/0005398 A1 | 1/2019 | Zheng |
| 2020/0033142 A1 | 1/2020 | Flug et al. |

* cited by examiner

*Primary Examiner* — Seng H Lim
(74) *Attorney, Agent, or Firm* — Orrick, Herrington & Sutcliffe LLP

(57) ABSTRACT

A system and method for managing and pathfinding using a coarse graph of low-level nodes representing the virtual world of a gaming environment.

20 Claims, 12 Drawing Sheets

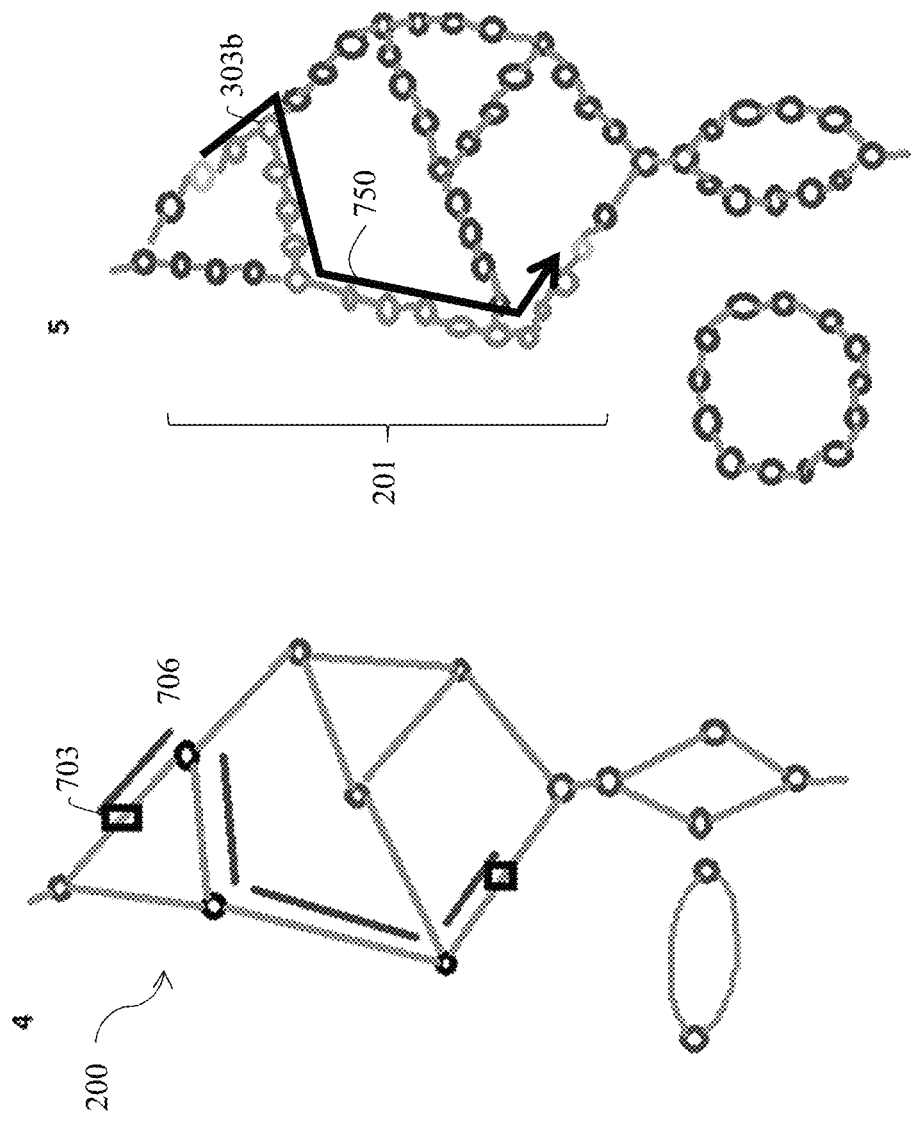

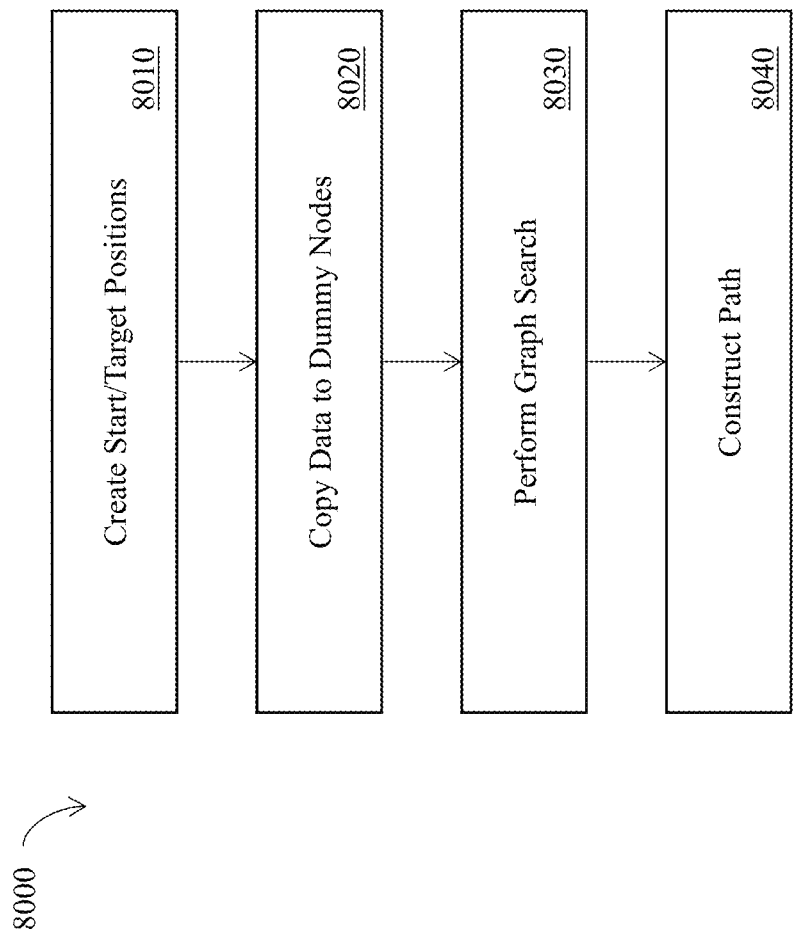

Fig. 9
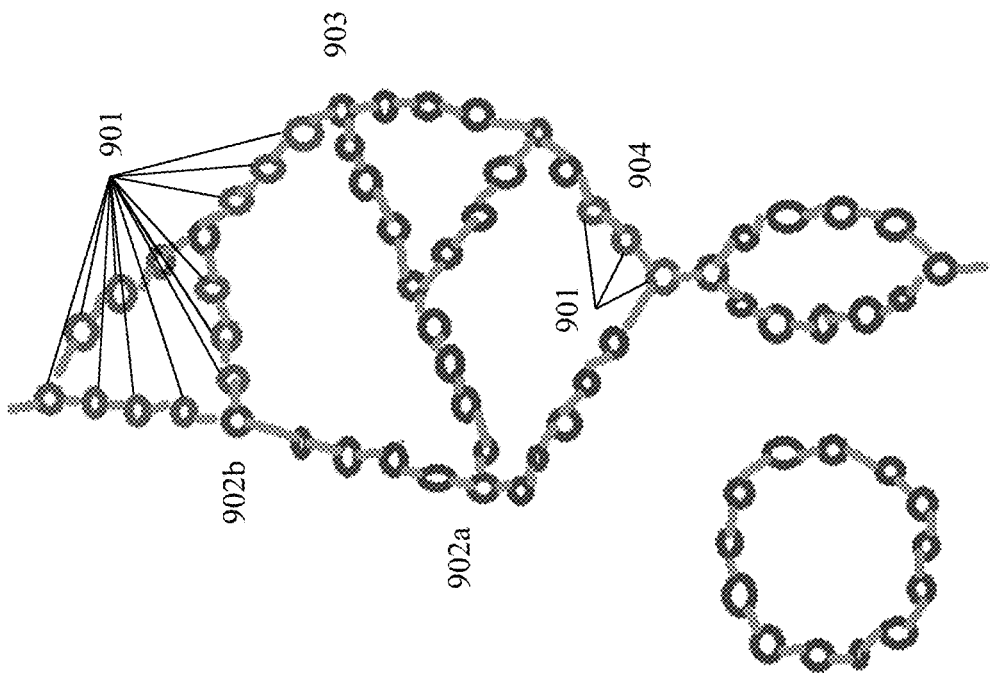

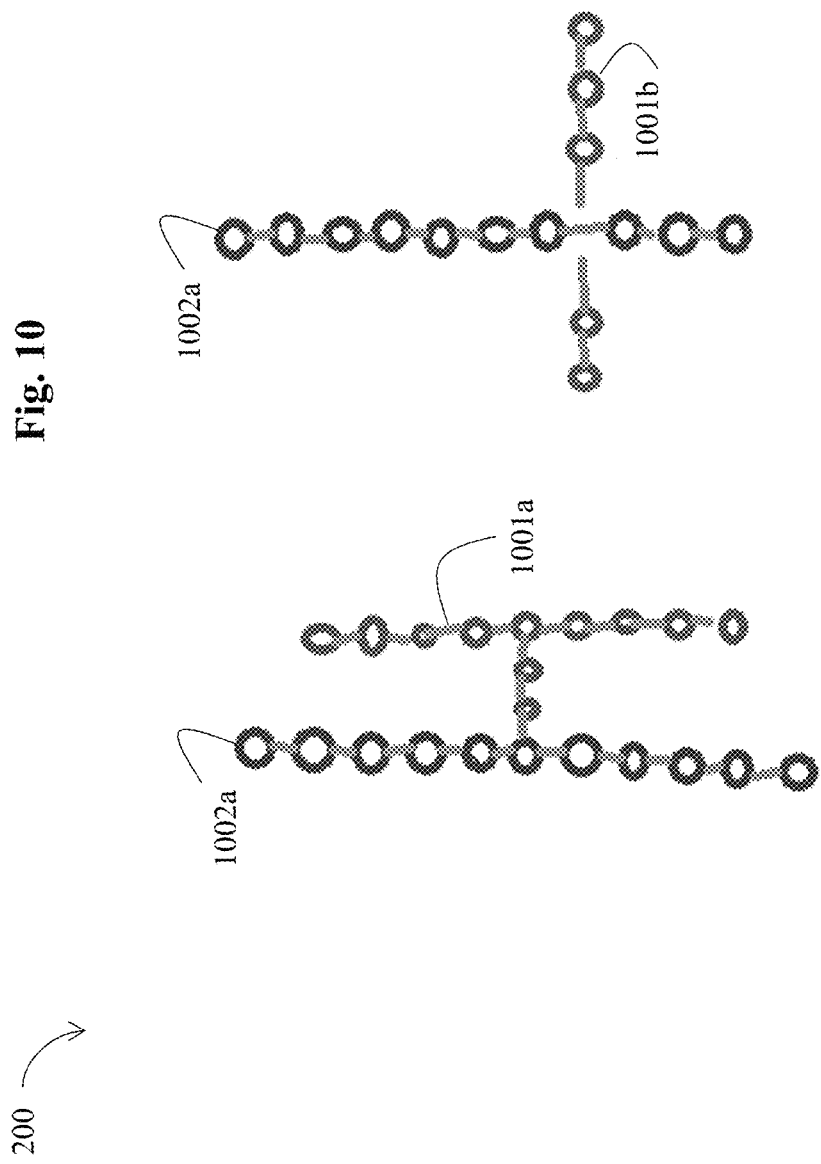

SYSTEM AND METHOD FOR VIRTUAL NAVIGATION IN A GAMING ENVIRONMENT

CROSS-REFERENCE TO RELATED APPLICATIONS

This application is a continuation of and claims priority to U.S. application Ser. No. 16/393,365, which was filed Apr. 24, 2019. The disclosure of the application is hereby incorporated by reference in its entirety and for all purposes.

FIELD

The present disclosure relates generally to video game systems and more specifically, but not exclusively, to video game systems and methods for managing nodes and node graphs relating to non-player characters.

BACKGROUND

Computer games often provide 3D worlds in which the game unfolds. Such games often include non-player characters (NPCs) that exist in the game's 3D world and who interact with the human players, the 3D environment and other NPCs. These NPCs can be programmed in an artificial intelligence manor such that their actions in the game are driven, at least in part, by real-time decisions made by the NPC algorithm regarding the current state of the game and the environment. Games such as these often use a collection of nodes (vertices) and edges (links) (the collection also known as graphs, directed graphs, node networks, and so on), among other things, to provide paths for non-player characters (NPCs) to traverse the game world. For example, each node might correspond to a physical location in the game world. And the nodes can be connected to one or more other nodes in a graph architecture.

Such nodes might have associated metadata that provides relevant game data that can be accessed by the NPC to determine its movement. To move around the game, the NPC can create a path that follows a series of nodes. For example, in a video game that involves vehicles and roads, nodes can provide road characteristics like speed, lane width, whether it is a highway, the number of lanes, and so on. Therefore, the series of nodes that an NPC can follow can represent a route from a starting location to a destination. For a straight section of road, nodes may be connected to their neighbors in a simple linear fashion creating a unidirectional path. Nodes representing junctions where roads interconnect would be more complex. For example, a simple intersection where two roads cross might be represented by a junction node that has four connections to other nodes. An NPC vehicle traveling through that road would enter via one of the connections and then have three choices for exiting the node (four if U-turns are permitted).

A node-based vehicle in conventional video games may make arbitrary decisions at junctions (wandering behavior). These node-based vehicles may not consider certain factors—such as traffic—when determining navigation. For example, some systems rely on low level vehicle avoidance to only have NPCs avoid vehicles and objects directly around it. This cannot account for changing lanes when parking cars, anticipating a road exit, weather conditions, and the like.

Furthermore, conventional systems only provide limited resources for automating NPCs. For example, processing power, memory, and efficiency only allow for a predetermined number of NPC controlled cars in any single instance of a conventional system. However, players of a video game would expect to see more than a predetermined number of NPC controlled cars in a video game for a realistic experience. In conventional systems, NPCs are often grouped by characteristics and perform the same motions. In fact, some NPCs of conventional systems fade out of existence as the player approaches the NPC.

As an additional drawback, conventional systems relied almost entirely on local traffic avoidance for NPCs to avoid collisions. This involves, each frame, checking the local environment for any potential obstructions (vehicles, pedestrians, objects), building up a view of that obstruction from the local vehicle (creating a 'front facing' polygon which is a list of points/lines that the vehicle will need to avoid in order to not hit the obstruction), generating information about the road the vehicle is on so they can avoid going off-road into buildings and finally generating and detecting the best steering angle to avoid all the obstructions. This is done every frame for each entity and no knowledge of the previous frame is used. This can result in very late detection of potential issues and no high level knowledge of 'this road is blocked;' instead, the system only indicates that there's something in my way to be avoided. Vehicles cannot plan accordingly, for example, if there is any type of road blockage.

In view of the foregoing, a need exists for an improved system for virtual navigation in an effort to overcome the aforementioned obstacles and deficiencies of conventional video game systems.

BRIEF DESCRIPTION OF THE DRAWINGS

FIG. 7B is an exemplary top-level block diagram continuing the illustration of the data flow for pathfinding of FIG. 7A;

FIG. 8 is an exemplary top-level flow diagram illustrating one embodiment of a process for pathfinding using the coarse graph of FIG. 3;

FIG. 9 is an exemplary top-level block diagram illustrating one embodiment of the data flow for validation of the coarse graph of FIG. 3; and FIG. 10 is an exemplary top-level block diagram illustrating another embodiment of the coarse graph of FIG. 2 that includes road densities.

Figure 1:
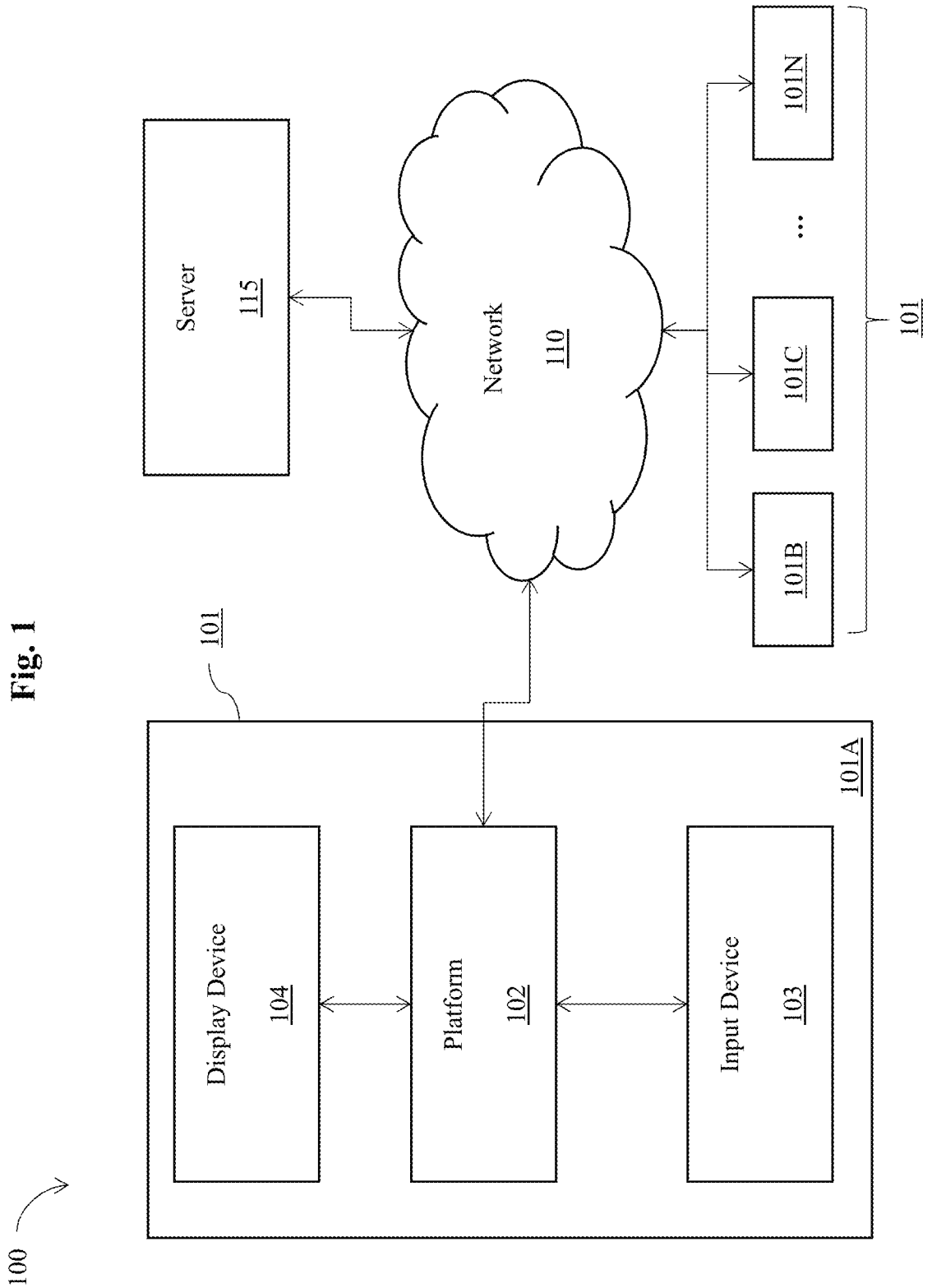
FIG. 1 is an exemplary top-level block diagram illustrating one embodiment of a network multiplayer gaming environment including at least one peer device.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF EMBODIMENTS

The present disclosure describes a number of methods and computerized systems for virtual navigation and management of objects in a multiplayer network gaming community. Since currently-available multiplayer gaming systems are deficient because they cannot provide realistic movements for non-player objects in a virtual world without increasing computational resources and/or restricting game development/design, a system for managing nodes and node graphs relating to non-player characters that provides virtual navigation and management can prove desirable and provide a basis for a wide range of network applications, such as creating a realistic virtual world that is not limited by hardware and software limitations. This result can be achieved, according to one embodiment disclosed herein, by a node network system 100 as illustrated in FIG. 1.

Turning to FIG. 1, the node network system 100 is implemented between a network 110 (e.g., cloud) comprising a server 115 (e.g., a single server machine, multiple server machines, and/or a content delivery network) communicating with a plurality of player consoles 101 (shown as any number of player consoles 101A-101N). A player console 101 can be any system with a processor, memory, capability to connect to the network, and capability of executing gaming software in accordance with the disclosed embodiments. A hardware and network implementation suitable for the disclosed system is described in greater detail in commonly assigned application Ser. No. 13/894,099, entitled "System and Method for Network Gaming Architecture," incorporated herein by reference.

The player console 101A is shown in further detail for illustration purposes only. As shown, the player console 101 can include any number of platforms 102 in communication with an input device 103. For example, the platform 102 can represent any biometrics, motion picture, video game, medical application, or multimedia platform as desired. According to one embodiment disclosed herein, the platform 102 is a gaming platform for running game software and various components in signal communication with the gaming platform 102, such as a dedicated game console including an XBOX One® manufactured by Microsoft Corp., PLAYSTATION 4® manufactured by Sony Corporation, and/or WII U® manufactured by Nintendo Corp. In other embodiments, the platform 102 can also be a personal computer, laptop, tablet computer, or a handheld mobile device. One or more players can use a gaming platform to participate in a game. Multiple gaming platforms may be linked together locally (e.g., via a LAN connection), or via the network 110 (e.g., the Internet or other communication networks).

The network 110 can also include any number of wired data networks and/or any conventional wireless communication network, for example, radio, Wireless Fidelity (Wi-Fi), cellular, satellite, and broadcasting networks. Exemplary suitable wireless communication technologies used with the network 110 include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

The platform 102 typically is electrically coupled to a display device 104. For example, the display device 104 can be an output device for presentation of information from the platform 102 and includes a television, a computer monitor, a head-mounted display, a broadcast reference monitor, a medical monitor, the screen on a tablet or mobile device, and so on. In some embodiments, the platform 102 and/or the display device 104 is in communication with an audio system (not shown) for presenting audible information.

In FIG. 1, the platform 102 also is electrically or wirelessly coupled to one or more controllers or input devices, such as an input device 103. In some embodiments, the input device 103 is a game controller and includes keyboards, mice, gamepads, joysticks, directional pads, analog sticks, touch screens, and special purpose devices (e.g., steering wheels for driving games and/or light guns for shooting games). Additionally and/or alternatively, the input device 103 includes an interactive-motion-tracking system, such the Microsoft Xbox One KINECT® device or the Sony PlayStation 4 Camera®, for tracking the movements of a player within a 3-dimensional physical space. The input device 103 provides data signals to the platform 102, which processes the data and translates the player's movements on the display device 104. The platform 102 can also perform various calculations or operations on inputs received by the sensor and instruct the display to provide a visual representation of the inputs received as well as effects resulting from subsequent operations and calculations.

In one embodiment, the platform 102 can be connected via the network 110 to the server 115 that can host, for example, multiplayer games and multimedia information (e.g., scores, rankings, tournaments, and so on). Users can access the server 115 when the platform 102 is online via the network 110. Reference herein to the platform 102 can include gaming platforms executing video game software or game software (e.g., computer program products, tangibly embodied in a computer-readable storage medium). Additionally and/or alternatively, references to the platform 102 can also include hardware only, or a combination of hardware and/or software. In some embodiments, the platform 102 includes hardware and/or software, such as a central processing unit, one or more audio processors, one or more graphics processors, and one or more storage devices.

In some embodiments, a selected player console 101A-N can execute a video game that includes one or more virtual players in a virtual world and at least one non-player object (NPC). NPCs can include, for example, cars, boats, aircrafts, and other vehicles in the virtual world. The virtual world can include game spaces that are modeled using graphs. For example, graphs can be used to explain spatial relationships in the virtual world as a collection of nodes and edges (also referenced herein as a "road network"). Accordingly, in the context of a virtual map, for example, nodes can be used to represent roads and/or junctions that connect one or more of the roads (collectively referred to as the "road network").

A road can be represented as a collection of nodes joined by links. As used herein, a graph fork is a node in the graph network that is linked to more than two other nodes. A junction node is a type of graph fork node that may require special processing (e.g., checking for lights, waiting for vehicles at exits, and so on). Therefore, a junction node is a graph fork node; but not all graph fork nodes require junction node logic.

A junction describes all junction nodes and all nodes linked to that junction node (e.g., entrance and exit nodes). Junctions can include information that defines its entrance/exit nodes, traffic lights, phase timings, stop positions, lane laws (e.g., left turn only), and any other logic that vehicles require at that junction.

The junction node includes any number of entrance/exit nodes. A node is an entrance if it has any lanes that lead into the junction node (defined on the link between a pair of nodes). Similarly, a node is an exit if the node has lanes leading from the junction node. A node can represent both an entrance/exit if there are lanes in and out of the junction. As an example in the virtual world, junctions can include junctions with traffic lights, as well as junctions without traffic lights.

Each node includes useful data that defines characteristics of the road or junction. Exemplary data includes speed, classification (e.g., a highway, a road, a private driveway, private land, and so on), supported vehicles (e.g., big vehicles, work vehicles, buses, sedans, motorcycles, bicycles, and so on), limitations (e.g., tunnel, low headroom), and so on. In a preferred embodiments, nodes can be contained in an object oriented data structure, such as a C++ class and/or structure, thereby providing for ease of scalability and modification.

The road network can also include "links" (or edges) that connect two nodes. Similar to nodes, links include information relating to that specific point on the road. Example information in a link object includes road width, camber, length of the link, number of lanes, and so on. Nodes provide several functions for entities or objects in the virtual world. For example, an entity can query the road network with its position in the world to find the nearest road and how to get to it using the node positions.

In some embodiments, the information related to a specific road can be stored in a selected node, a link connecting two nodes, and/or a combination of both as desired. For example, while information related to the width or number of lanes in a road can exist in either a node or a link, information related to the camber of a road is likely maintained in the link that represents the length of the road (between two nodes) instead of a single node that represents a single point in the world. The data in the node/links can tell entities about the type of road they are on and to act differently depending on the results. For example, driving slower on residential-type roads or having to perform certain maneuvers to avoid oncoming traffic on single-lane streets.

Prior art systems generally include road nodes that are spaced relatively close together. However, for NPCs traveling a longer distance route (e.g., an autonomous vehicle that is driving around the city), creating a route for the NPC using the densely situated road nodes results in a traversal of an extraneous number of nodes. Accordingly, in some embodiments, the node network system 100 can create a high-level graph of the road nodes, such as a coarse graph 200 shown in FIG. 2.

Figure 2:
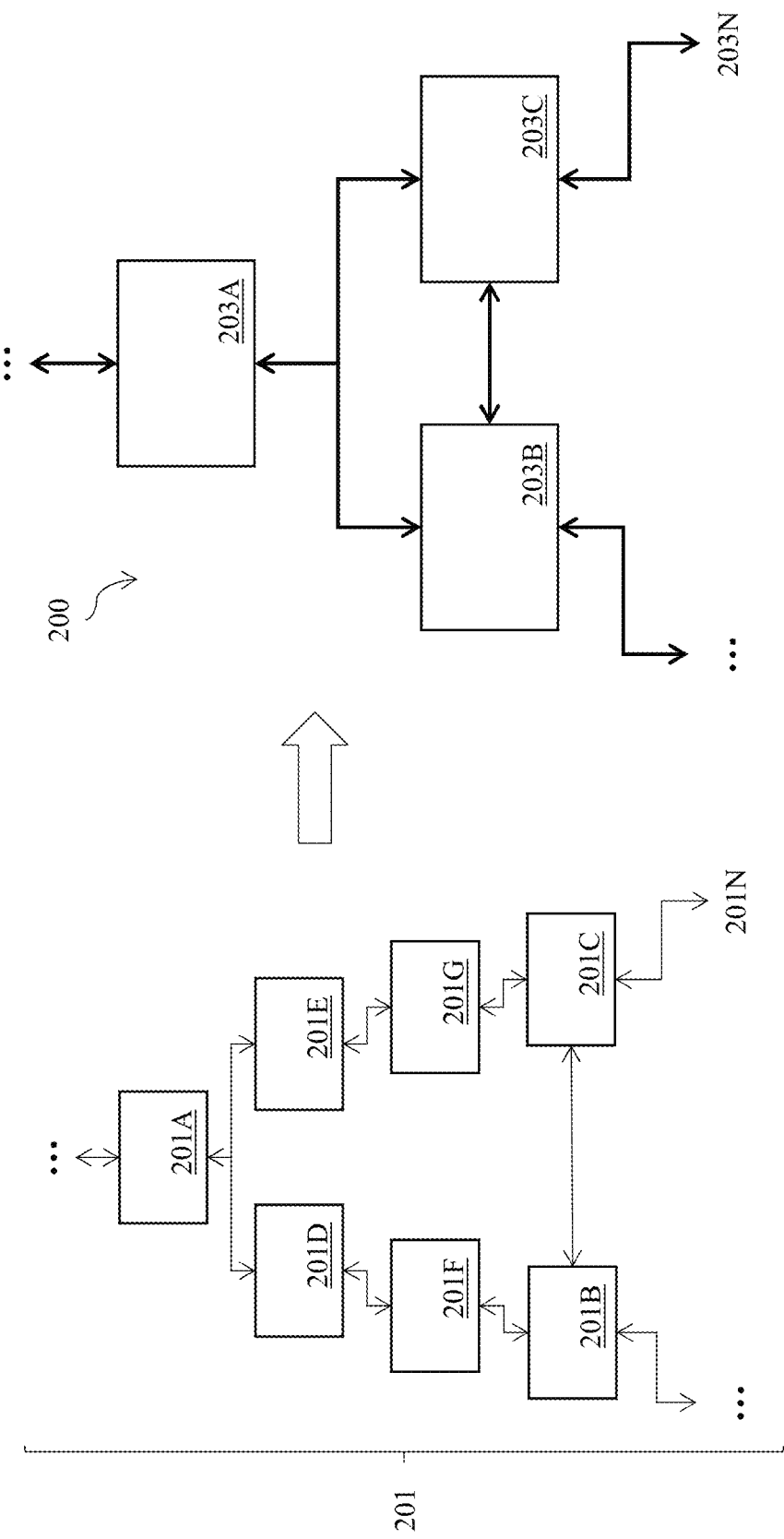
FIG. 2 is an exemplary top-level block diagram illustrating one embodiment of a coarse graph of a low-level node network representing a virtual world of a multiplayer game using the network multiplayer gaming environment of FIG. 1.

Turning to FIG. 2, the coarse graph 200 represents a high-level graph of low-level nodes 201 in the road network. The underlying low-level node 201 graphs often include a lot of repeated information, such as, for example, repeated lane widths, speed limits, and so on. For example, a straight stretch of road with no entrances or exits in the virtual game can be represented as a large number of similar nodes that can be ignored for path-finding purposes. The coarse graph 200 can compress these similar nodes. In other words, the coarse graph 200 can group similar nodes and junctions and can be used for long distance pathfinding. The coarse graph 200 advantageously reduces the number of loads needed by the processor as every low-level node being represented by the coarse graph 200 need not be in memory at all times. In some embodiments, searching either the coarse graph 200 or the low-level graphs that comprise the coarse graph 200 yields the same result—while searching the coarse graph 200 advantageously avoids expanding fewer low-level nodes 201 and saves computational cost and resources.

Each node 203 in the coarse graph 200 includes additional data that associates the selected node of the coarse graph 200 with its corresponding low-level node 201 (e.g., fork node) in the low level graph. By way of example, as shown in FIG. 2, the coarse node 203A includes an exact copy of the low-level node 201A with some additional data described herein; the coarse node 203B similarly associated with the low-level node 201B; and the coarse node 203C similarly associated with the low-level node 201C. In the event that the data of a selected low-level node 201 is modified, the modification is dynamically updated in the associated coarse node 203. In a preferred embodiment, validation of the coarse graph 200 includes determining whether any coarse nodes 203 of a collection of low-level nodes 201 representing a straight section of road includes any different data from other nodes in the collection. Stated in another way, when running a search on the coarse graph 200, each node 203/link of the coarse graph 200 includes information for each junction that will match the underlying low-level graph to get the same results.

Figure 3:
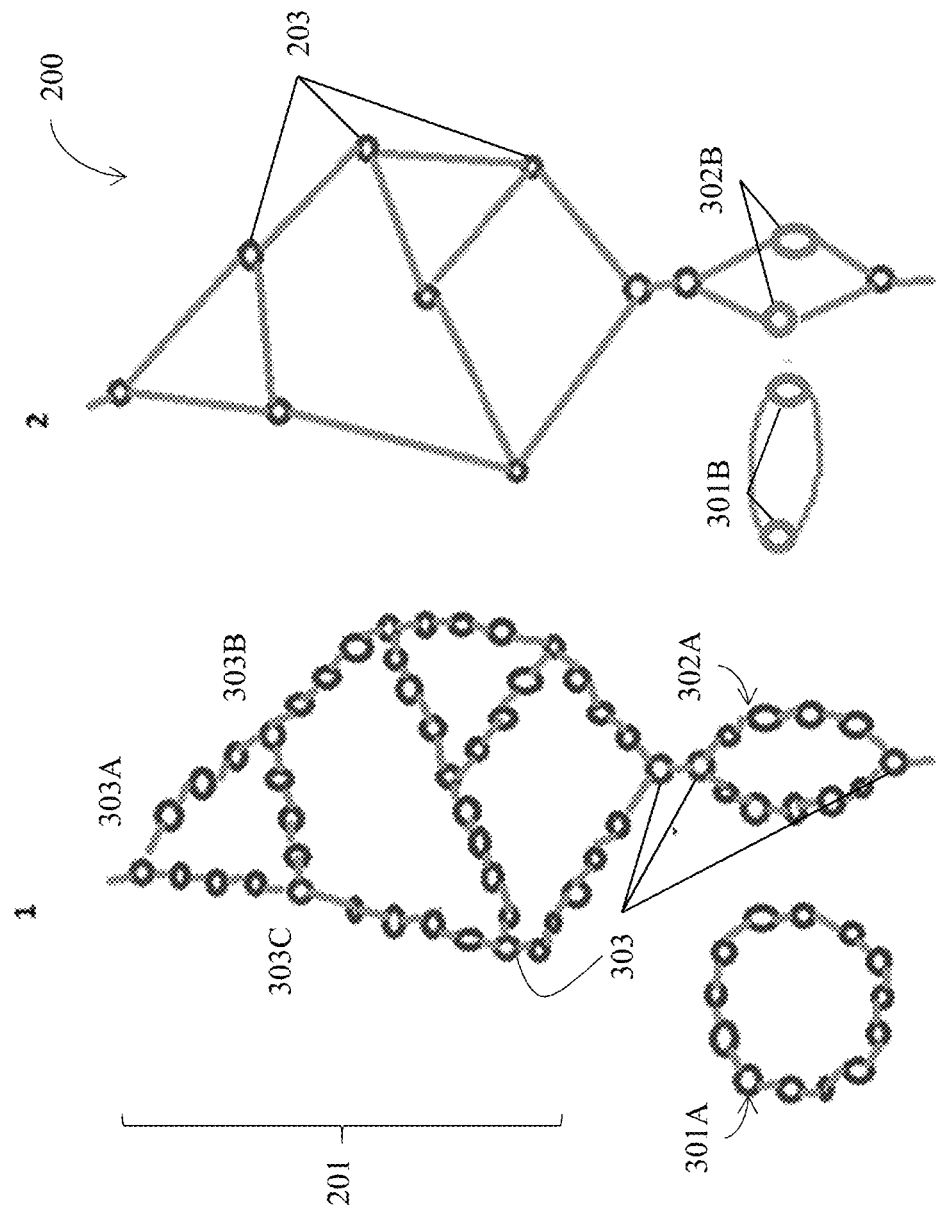
FIG. 3 is an exemplary top-level block diagram illustrating one embodiment of the coarse graph of FIG. 2.

As also shown in FIG. 2, in some embodiments, the coarse graph 200 is generated from one or more low-level nodes 201 during the build of the game. Turning now to FIG. 3, an exemplary coarse graph 200 of low-level nodes 201 is shown. In a preferred embodiment, every low-level node 201 between two graph forks includes similar information. Therefore, the coarse graph 200 can simplify the low-level nodes 201 and create a graph of the graph forks of the low-level nodes 201. The coarse graph 200 can be constructed in any manner described herein, such as an exemplary process 4000 for coarse graph construction as shown in FIG. 4.

Figure 4:
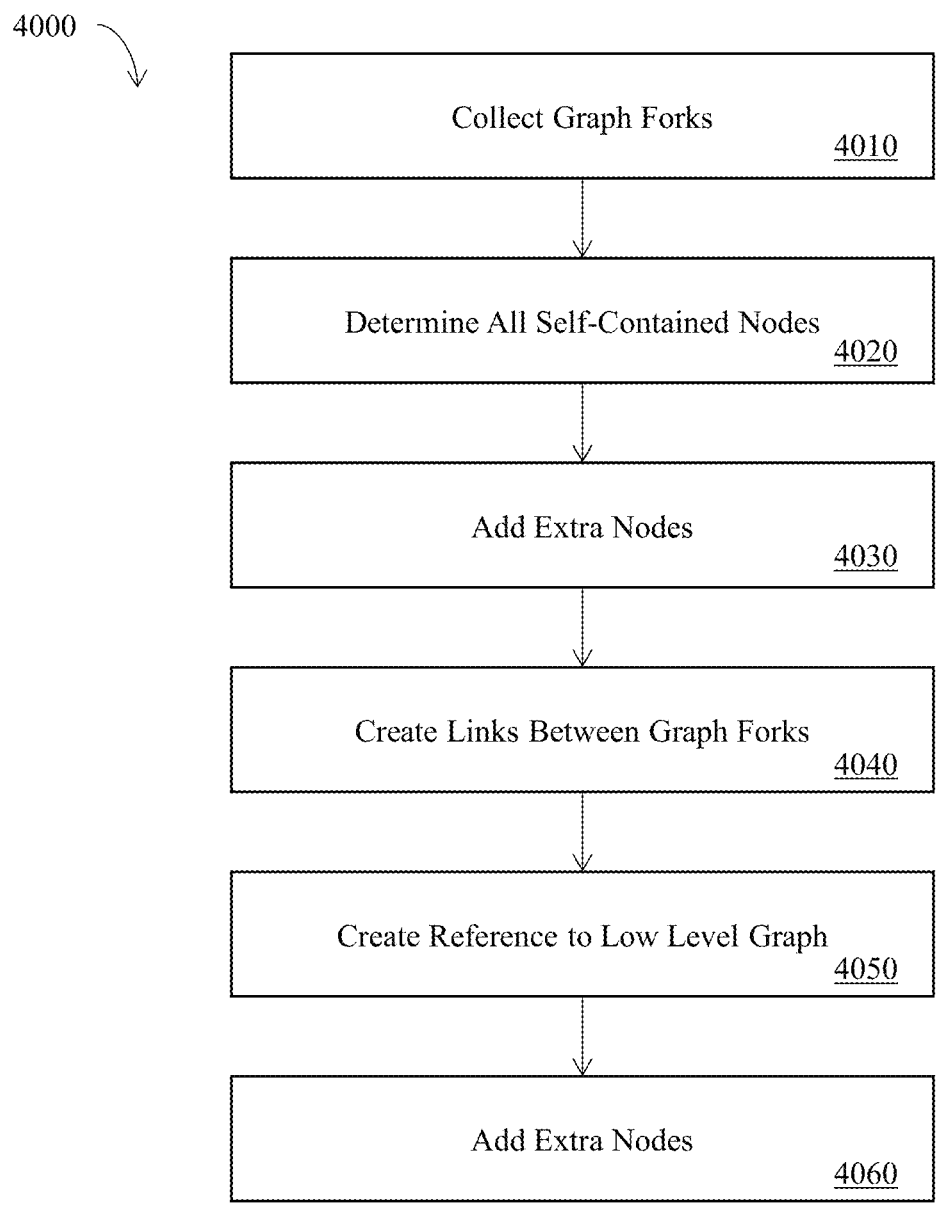
FIG. 4 is an exemplary top-level flow diagram illustrating one embodiment of a process for generating the coarse graph of FIG. 3.

With reference to FIGS. 3 and 4, the process 4000 for coarse graph 200 construction begins with a collection of all graph forks 303 (nodes linked to more than two other nodes), at 4010. In some embodiments, the collection of graph forks 303 can be maintained in a list. Stated in another way, once a graph of low-level nodes 201 has been designed to represent the virtual world, all "fork" nodes 303 are identified in the low level graph. Fork nodes represent any nodes in the low-level graph that includes two or more links.

These fork nodes require a decision to be made for any pathfinding search or traversal of the low level graph.

Subsequently, for any collection of nodes in the low level graph that does not include any "fork" nodes and/or includes "fork" nodes that lead to the same destination (e.g., a fork in the graph where one of the exits is a shortcut to the same destination), extra coarse nodes 203 are generated to avoid losing information when collapsing the low-level graph.

To add extra coarse nodes 203, "circular" paths are determined, at 4020. As used herein, "circular" paths include those nodes and edges forming a self-contained path 301 and those nodes and edges having two graph forks that lead to one another (e.g., path 302). For both of these paths 301 and 302, two extra nodes are added to the list of graph forks 303, at 4030. By way of example, FIG. 3 illustrates a self-contained path 301A and a path 302A including two graph forks 303 that lead to one another in the graph of the low-level nodes 201. For each of paths 301A and 302A, two additional nodes 301B and 302B for each circular path are added to list of graph forks 303. In this way, the additional nodes represent a path that must be traveled in the coarse graph 200 that may have otherwise been lost in the generation of the coarse graph 200 as the path would eventually lead to the same destination.

Figure 5:
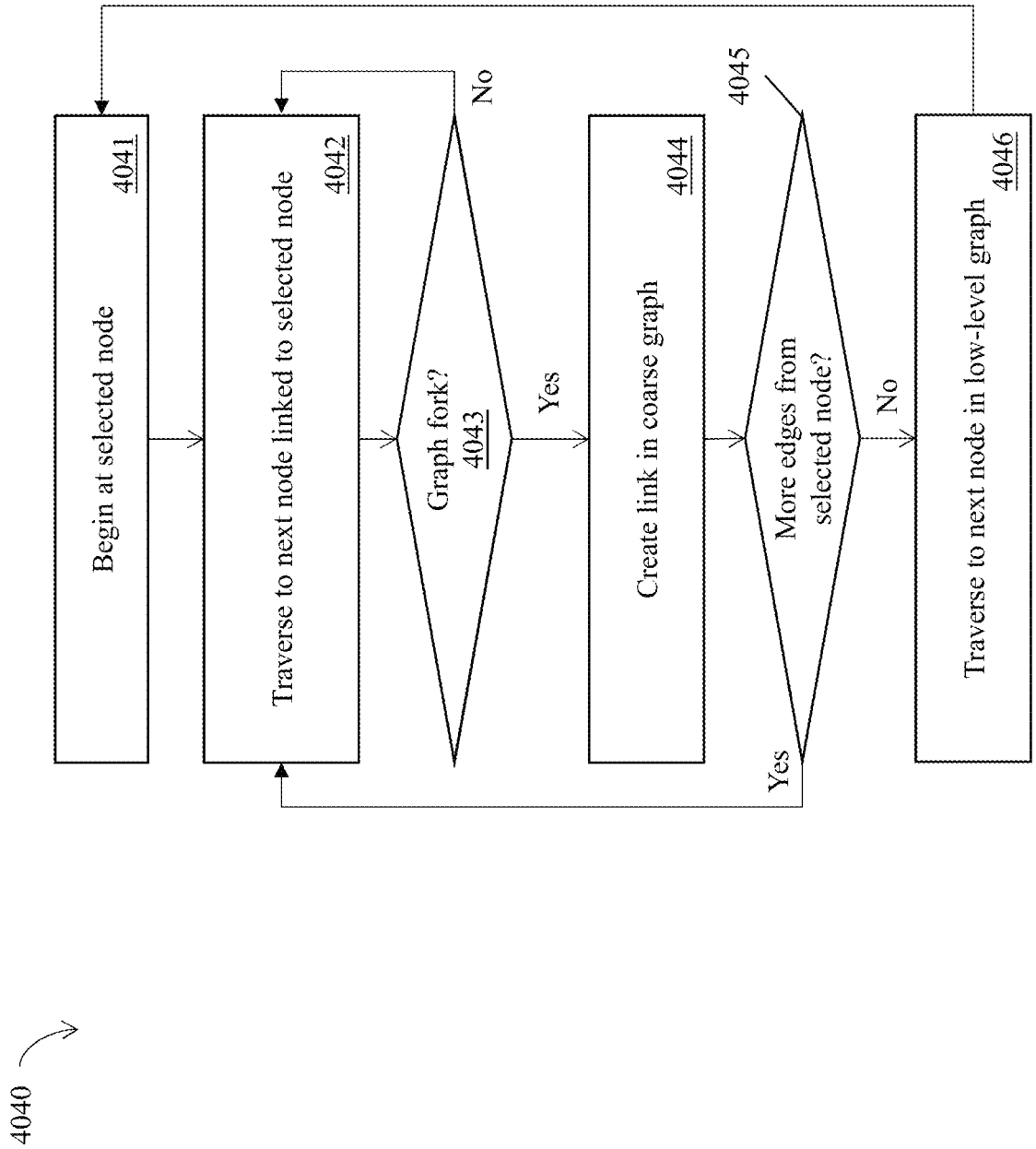
FIG. 5 is an exemplary detailed flow diagram illustrating one embodiment of the link creation process of the coarse graph generation process of FIG. 4.

Once all graph forks 303 have been determined, links are created between selected nodes, at 4040. Turning to FIG. 5, a detailed flow diagram for creating links between selected nodes is shown. As illustrated, a first node is selected, at 4041. For example, with reference to FIG. 3, a first node 303A is selected. For each link connected to graph fork 303A, the low-level nodes 201 are traversed (at 4042) until a graph fork 303 (decision block 4043) from the list prepared in step 4010 is discovered. In the example graph of FIG. 3, the low-level nodes 201 are traversed from graph fork 303A until graph fork 303B is reached. A link is then created (at 4044) between 303A and 303B that includes the information stored in any link between the two nodes of the original low-level node 201 graph. The sum of the distances of all nodes between 303A and 303B are copied to the corresponding link in the coarse graph 200.

For each of the extra coarse nodes generated, the associated node in the low-level graph is marked as a beginning node. Starting from the associated node, each link of the associated node is traversed until a second low-level node is reached that is represented by a corresponding node 203 in the coarse graph 200. The total distance traversed until the second low-level node is reached is captured in a link of the coarse graph 200 that connects the two corresponding nodes 203 in the coarse graph 200.

In this way, the data for a generated coarse node 203 matches that of the low level graph fork node and the link data to the next coarse node is copied from any low level link between the two nodes (as they're all the same). The 'length' of the link for the coarse node 203 is a sum of the lengths of all the links between the two graph forks in the corresponding low level nodes 201.

Steps 4041 through 4044 are repeated for all links for the first graph fork 303A, at 4045. Steps 4041 through 4045 are also repeated for all nodes in the graph to create links between all graph forks 303, at 4046. Once completed, the coarse graph 200 shown in FIG. 3 on the right is generated from the original graph of the low-level nodes 201 on the left.

Figure 6A:
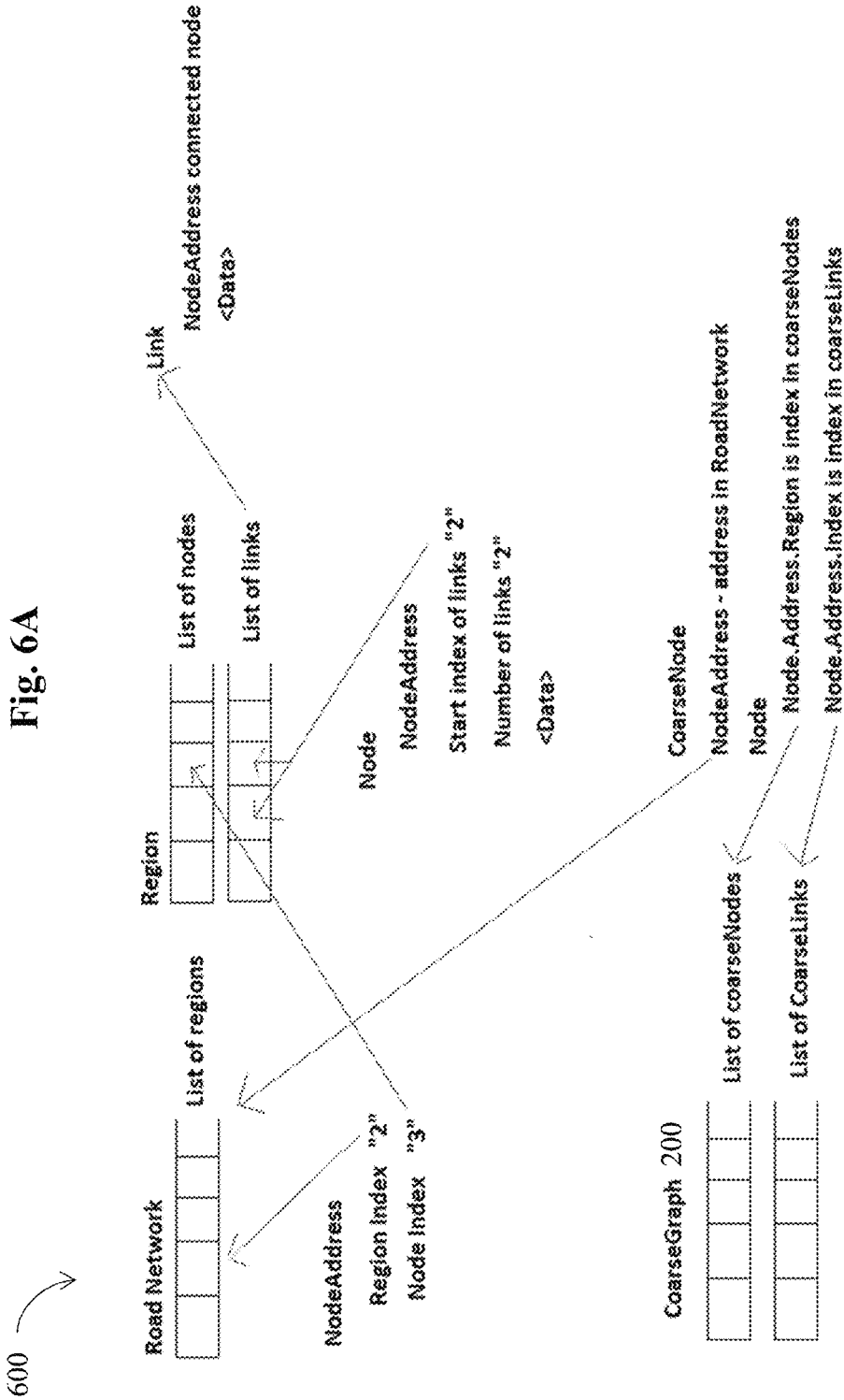
FIG. 6A is an exemplary top-level diagram illustrating one embodiment of the reference tables and data flow for the exemplary coarse graph of FIG. 3.

After the structure of the coarse graph 200 has been generated, references to the corresponding graph of the low-level nodes 201 are created, at 4050. An exemplary reference table 600 is shown in FIG. 6A. In the low-level graph, an address.region of a selected low-level node provides an index into the list of regions stored in the graph. In the example shown in FIG. 6A, the road network graph represents a high-level list of regions that include the nodes and links of the low-level graph. In other words, the road network shown in FIG. 6A represents the road network of the virtual world and/or the low-level graph. The coarse graph 200 shown in FIG. 6A includes the list of coarse nodes 203 and coarse links that is constructed from the road network described herein. In a preferred embodiment, the list of regions is a C++ array data structure that includes other regions in the virtual world. However, those of skill in the art will appreciate that any object-oriented or generic programming data structure can be used as desired.

Figure 6B:
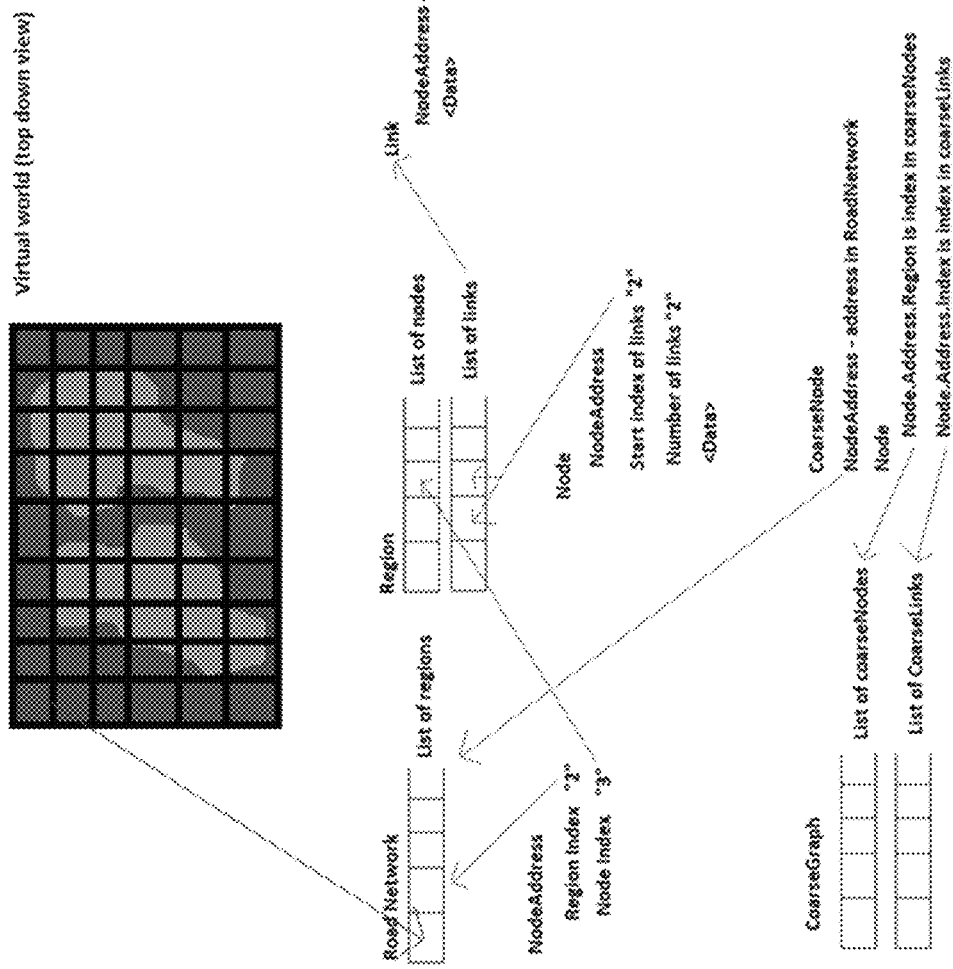
FIG. 6B is an exemplary top-level diagram illustrating another embodiment of the reference tables and data flow of FIG. 6A.

Each region represents a predetermined area of the virtual world, such as shown in FIG. 6B (e.g., represented by a minimum and maximum position in the virtual world (not shown)). As shown, each region includes a single list of all nodes in that region (e.g., all nodes physically located within the bounds of the region in the virtual world) and a single list of all links within that region. In other words, the data for the road network graph can be found from the list of regions. In this example, a CNode.Address includes a reference to a selected region from the list of regions using address.region. In addition, the address.index can then be used to identify the individual node within the regions list of nodes. An index.region is an index of the list of nodes stored in the region referenced by the address/region. Each coarse node 203 includes a copy of the low-level node in the low-level graph, with some modifications. For example, as shown in FIG. 6A, the address.region and address.index field have been modified so that the index is a pointer into the coarse graph 200 node and link list. The coarse nodes 203 also have an address that represents the corresponding node in the road network that is represented by the coarse graph 200. In some embodiments, a node 203 in the coarse graph 200 includes at least two variables (e.g., bits, integers, and so on)—one variable for maintaining the address.region/index of the low-level node described above; and a second variable representing the location of the coarse node position and coarse node link in the coarse graph 200. In other embodiments, a copy of the low-level node can be maintained such that the low-level node.address points into the same location while the coarseNode.address points into the coarse graph.

Once the references have been established, two extra "dummy" nodes that initially include no data are added to the coarse graph 200, at 4060. The dummy nodes can be populated during the path finding with any associated links to the dummy nodes (in this case, four additional links are added) and other relevant data. These dummy nodes can be used for any path finding discussed herein. When a search is requested that starts or ends on a road that is 'between' two coarse nodes, the closest node in the low-level graph is used and the generation process described above to 'step' along the road until finding the coarse nodes on each edge of the road is performed. This generates routes to the exact position requested rather than the nearest coarse node that was generated off line and only the road network briefly around the start/end nodes are loaded when needed.

Advantageously, compared to the low-level node graph, the coarse graph 200 can be searched for a more efficient path along any two points in the virtual world. Since less data needs to be streamed to perform searches, searches are orders of magnitude faster than performing searches on the low-level graphs. Searches on the coarse graph 200 can be done in any manner described herein, such as an exemplary process 8000 shown in FIG. 8.

Figure 7A:
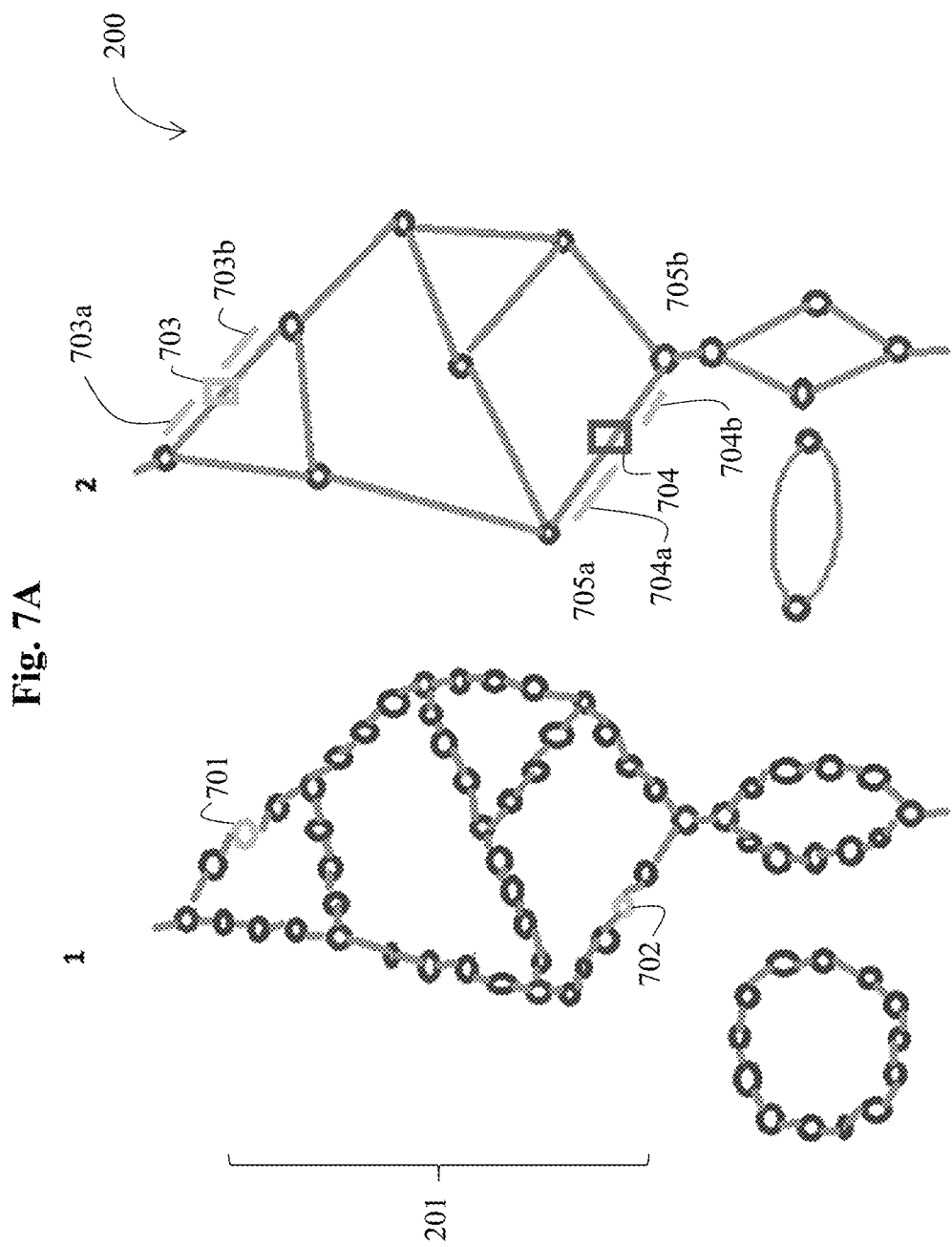
FIG. 7A is an exemplary top-level block diagram illustrating one embodiment of the data flow for pathfinding using the coarse graph of FIG. 3.

Turning to FIG. 8, the process for pathfinding begins by determining the starting and target nodes on the low-level node 201 graph, at 8010. For example, with reference to FIGS. 7A-B, a start node 701 is determined to have a target node 702 as its destination. In this example, because neither the start node 701 or the target node 702 comprises a graph fork (i.e., having no corresponding coarse graph 200 node), two "dummy" nodes 703 and 704 are added to the coarse graph 200 (similarly discussed with reference to step 4060 of FIG. 4). In some embodiments, the "dummy" nodes 703 and 704 do not include any data at creation of the coarse graph 200. Additionally and/or alternatively, associated links can be populated with information required to navigate from the dummy nodes at runtime. Advantageously, reserving data population until runtime maintains list size and reduces computational cost as data is only loaded when needed. The node data from the start node 701 and target node 702 is copied into the dummy nodes 703 and 704 respectively, at 8020, such as shown in FIG. 7A. For each dummy node 703, 704, two additional links 703*a, b* and 704*a, b* are populated with the data required to navigate from the dummy node 703, 704, to other coarse nodes (e.g., nodes 705*a, b*).

Once the dummy nodes 703, 704 have been populated, a search is conducted using a modified graph search, at 8030. For example, any pathfinding or graph traversal can be used to plot an efficient directed path between nodes 703, 704 on the coarse graph 200. Examples of graph traversal techniques include, but are not limited to A*, B*, Dijkstra, Edmonds, Fringe search, Hill climbing, beam, Bellman-Ford, iterative deepening, Floyd-Warshall, and the like. In some embodiments, these graph traversal techniques are modified to account for driving physics (e.g., a u-turn instead of driving in reverse).

In some embodiments, once a path is determined, a full route between the nodes 703 and 704 is constructed using the low-level nodes 201, at 8040. Starting with coarse graph dummy node 703, the address of the corresponding node in the low-level node 201 graph is determined. For example, using the reference table 600 shown in FIG. 6A, the corresponding address of the low-level node 201 for the dummy node 703 can be determined using "CoarseGraph.NodeAddress." Based on the search conducted at 8030, the link from the dummy node 703 is traversed to the graph fork 706 of the coarse graph 200. The node address of the corresponding low-level node 201 graph for graph fork 706 is then determined. For example, the corresponding low-level node for the graph fork 706 of the coarse graph 200 is graph fork 303*b*. This construction process is repeated until the target node 704 is reached. This creates a final route 750 shown in FIG. 7B.

Advantageously, pathfinding on the coarse graph 200 yields the same result as pathfinding on low-level nodes 201; however, the pathfinding on the coarse graph 200 expands fewer nodes. As the address for each relevant low-level node 201 in the path is known at the coarse graph 200 level, pathfinding can be done on both the low-level nodes 201 and the coarse graph 200.

Additionally and/or alternatively, a start and target node need not be determined in the pathfinding process 8000 described herein. In this situation, a random "wander" path can be constructed that locally selects exits to use at graph forks based on predetermined game scenarios.

In some embodiments, route generation includes determining all nodes that are linked to a current node. Accordingly, a "delegator" represents an object-oriented programming object can be created to abstract the graph being used from the pathfinding process 8000. Accordingly, when the pathfinding process 8000 requests data (e.g., a linked node), the delegator is called (e.g., "Delegator.GetLinkedNode (node, index)"). The delegator retrieves the data from any graph based on the node addresses stored in the coarse graph 200 or the low-level graph nodes to access the correct regions/links/nodes, such as shown in FIG. 6A. For example, with reference again to FIG. 6A, the delegator for the coarse graph 200 will determine the link index through the coarseNode.Node.Address.index to access the CoarseGraph.LinkList for that node. The low-level graph delegator similarly calls node. StartIndexOfLink+index to address the list of links in the region defined by Node.Address.Region. Advantageously, the delegator handles data access from memory while the pathfinding process 8000 can ignore which graph the search is performed on.

Once the pathfinding process 8000 constructs a final route 750 that includes a list of low-level nodes 201, various bits of data can be extracted for node-based navigation. For example, road width, speed, lane information, and so on is queried to create an abstract representation of the road that should be driven on in the video game. The world positions of the nodes are used to create smooth splines that connect the nodes so the vehicle generally follows a smooth curved path when navigating the list of nodes. Node based navigation includes creating a list of future nodes that an entity will navigate along using the positions of the nodes to create lines/splines to follow. Entities using nodes can query the data to see how fast they should go, how much space they can use how tight/sharp upcoming corners are.

For each video game frame that is rendered, the vehicle can update its position along the list of nodes for the final route 750 and set desired speeds and turning values based on the data in the list of nodes.

In some embodiments, when a vehicle has traveled a predetermined number of nodes in the final route 750, the vehicle can regenerate a new pathfinding route to account for new nodes and processes that may have been added to in-game memory or cache. Advantageously, memory use is improved as a smaller number of nodes are loaded at any given time for a vehicle to correctly navigate from any start to any destination in the game. As an additional advantage, the entire virtual map for the game need not be loaded in memory at all times as the results for a specific route can be loaded and stored to specific NPC's. In other words, each NPC can use a local list for pathfinding rather than creating a larger pathfinding route relative to the entire virtual map.

In some embodiments, before the coarse graph 200 is traversed, a validation can be performed. For example, the low-level graph can be validated to prevent data tags on the nodes/links that lead to dead ends. By way of example, a road cannot allow "big vehicles" and lead to a junction that does not have any exits for the big vehicle. To avoid this dead end, start and end nodes of the low-level graph can be verified to check that their data matches (e.g., for relevant tags).

In some embodiments, nodes are associated with various data tags. Relevant tags define restrictions/conditions for using the road and include "switched off," "river," "no_wagons," "highway," "private_use," "number of lanes," "one way street," and so on. For example, the tag "switched off" can indicate that the road should not be used for a specific vehicle. When approaching a junction and deciding which node path to travel, specific tags can be filtered to eliminate selected nodes from any pathfinding. Turning to FIG. 9, an entire section of the low-level nodes 201 as well as selected nodes can be "switched off" (nodes 901).

With reference to the low-level nodes of FIG. 9, there are three validation situations. First, a validation error is apparent from the nodes leading from node 902a to 902b as it creates a dead-end at a junction where there are no valid exits that are not "switched off" (nodes 901). Accordingly, vehicles approaching this junction will get stuck. Second, at node 903, there are at least two entrances/exits that are not "switched off" so vehicles approaching this junction can choose a valid exit. Finally, at node 904, a second validation error occurs as the road suddenly includes "switched off" nodes 901. Vehicles approaching node 904 will eventually get stuck.

Although an example is provided using the "switched off" tag, those skilled in the art will recognize that any number of validation checks can occur including, but not limited to, dead ends, conflicting flags (e.g., water and wagon flags), overlapping junctions, distance checks between nodes, and so on.

Additionally and/or alternatively, before the coarse graph 200 is traversed, a pre-search optimization can be performed to confirm that a complete route can be determined using any pathfinding process discussed herein. By way of example, start/end nodes can be on different "islands" of the virtual world. In this example, each node can have an index representing an "island", which index can be generated at build-time. An island of nodes includes all nodes that are connected to each other by some order of links. For example, with reference to FIG. 7, there can be two islands represented by the two unconnected sets of nodes. A check can be performed if the start and end nodes for the search are on the same islands in FIG. 7 during a path finding process. If they are not, there is no feasible path across these two islands. By way of a second example, the route can be filtered by any node tags, such as using the various data tags that define restrictions/conditions discussed herein. A pre-search optimization can include a check to determine that a full route can be generated with nodes having these tags.

While traversing road nodes, each NPC can define its own specific characteristics for traversing the road nodes. These characteristics can define the distinction between vehicle types/models that have various speed restrictions and benefits. By way of example, various characteristics and parameters can include acceleration, times/distances, braking times/distances, top speed, cornering speeds (i.e., maximum speeds the vehicle can take at a corner without spinning or going off line). In some embodiments, physics data defines vehicle size, width, type (e.g., boat versus car), and so on. Driver data can define driving ability, speed, and so on. Based on the parameter, the data is generated in any number of ways. For example, acceleration is generated by getting the car from a stop to full throttle until it reaches a maximum speed and recording the time taken to reach predetermined speeds. A data file can be provided that indicates cars/weather/tests to perform to determine optimal characteristics.

As another example, cornering can be generated by getting the vehicle to take corners of different radii at increasing speeds until the vehicle can't handle the corner. Once this has been done, these points are used to generate a best-fit curve plotted on a graph. A "type" of curve that the data points create is recorded. For example, the type of curve can be linear, exponential, quadratic, and/or so on. Using acceleration as an example, an offset exponential function can be used: $y=a+b*exp(x*-c)$. In this example, given a speed x, a distance y required to reach that speed can returned based on the best-fit curve above. The parameters a, b and c can be generated from the data points for each individual car (or car class) for each different surface and weather type. Thus, instead of having a list of unnecessary points for each car/surface/weather, three values a, b, c can be used to get the acceleration result for any value of x. To generate the a, b, and c values, a curve fitting process, such as a least squares method, can be used.

In some embodiments, different road nodes can define different densities. For example, main streets should have more cars than side streets. A low density road next to a high-density road can result in high-traffic areas. Low density roads near high density roads can result in low density roads having fewer vehicles than would be realistic due to distance checks made via radial distance checks. By way of example, with reference to FIG. 10, a car crossing on a local road 1001a running parallel to a busy highway 1002a can affect the density of the busy highway 1002a as the local distance check can consider this "close" for purposes of a density check on the road. Similarly, a car crossing on the busy highway 1002a at an overpass over the local road 1001b can cause a "false" reading of a car being on the local road 1001b, despite no connection/link between the two paths. In both of these examples, the low density local roads 1001 may have fewer cars than expected as the large number of vehicles on the busy highway 1002 can interfere with the number of cars that should be on the local road. Furthermore, ambient vehicles can maneuver in any direction following a spawning of the vehicle, thereby leading to unrealistic traffic densities.

Accordingly, in some embodiments, distance checks can also be based on nodes/road networks rather than the local distance/radial check. The system can also push ambient vehicles to alleviate traffic jams.

In this embodiment, distance checks "along" a path are conducted. For example, as shown in FIG. 10, the local road 1001a includes a short path to the highway 1002a so any cars on the local road 1001a and/or the highway 1002a can be considered for density checks. However, for the local road 1001b that does not have a path to the highway 1002a, cars on each road should not be counted against the density for either road.

In some embodiments, a density check can include locating all links around a player in a game where a vehicle can be spawned. Locating all links depends on where the player is in the virtual world, the direction they are looking, the road types surrounding the area, and so on. Each link can include a "density" value that represents a number of vehicles per distance that should be surrounding the link. A current density for a selected link is determined and compared to the "density" value for the link—this determines the number of vehicles that should be spawned at this location.

By way of example, a link with a density of 4 (i.e., 1 vehicle every 20 meters) is determined to have two vehicles, each spaced about 10 meters from the link. Each vehicle provides 2 units of "vehicle density" to the link, which yields a net of density 0 for the number of vehicles that should be spawned for this link. In this example, no vehicles are needed to be spawned for this link condition to be satisfied. Alternatively, if one of the two vehicles moves out of range of the 20 meters, the net density is then 2 and a second vehicle can be spawned.

In yet another embodiment, NPCs can also account for exigent circumstances, such as a high-speed chase. For example, in addition to using local avoidance based on the coarse graph 200, splines can be generated through ambient traffic. In other words, vehicles in the virtual world that are obeying traffic laws are used to generate routes through/around them. A list of ambient traffic in the area can be generated and for each vehicle, information related to the subject NPC is recorded. For example, the space between two vehicles, relative direction of travel, velocity differences, and so on. Based on this information, a route can be plotted towards the final destination.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

The invention claimed is:

1. A computer-implemented method for virtual navigation in a road network of a gaming environment, the road network of the gaming environment being represented by a low-level graph comprising one or more low-level nodes joined by links, the method comprising:
    generating, from the low-level graph of the road network of the gaming environment, a coarse graph of the road network of the gaming environment;
    determining, using the coarse graph of the road network of the gaming environment, a path from a start node to a target node, wherein the path comprises coarse graph nodes; and
    generating, from said path comprising coarse graph nodes, a full route from the start node to the target node, wherein the full route comprises low-level nodes.

2. The computer-implemented method of claim 1, wherein said generating the coarse graph comprises:
    selecting graph forks from the low-level nodes of the low-level graph of the road network, the graph forks representing those low-level nodes having two or more links to other low-level nodes;
    generating coarse graph nodes based on the selected graph forks;
    generating extra coarse graph nodes for each collection of nodes of the low-level nodes that do not include any graph forks and each collection of nodes of the low-level nodes that include graph forks having a circular path;
    generating links between the generated coarse graph nodes, the links including information stored in any link between the graph forks of the low-level nodes and the number of low-level nodes between the graph forks; and
    generating a reference table between the coarse graph and the low-level nodes.

3. The computer-implemented method of claim 2, further comprising generating additional dummy nodes that include no data and additional links for the dummy nodes.

4. The computer-implemented method of claim 3, wherein said determination of the path further comprises copying data from the start node to a selected dummy node and copying data from the target node to a second dummy node.

5. The computer-implemented method of claim 2, further comprising collecting all the selected graph forks in a list.

6. The computer-implemented method of claim 2, wherein said generating links between the generated coarse graph nodes comprises traversing the low-level nodes from a first graph fork to a second graph fork.

7. The computer-implemented method of claim 1, wherein said determination of the path comprises determining whether the start node or the target node comprises a graph fork, the graph forks representing those low-level nodes having two or more links to other low-level nodes.

8. The computer-implemented method of claim 7, further comprising generating additional dummy nodes that include no data and additional links for the dummy nodes when the start node and the target node do not include a graph fork.

9. The computer-implemented method of claim 8, further comprising populating the additional links with data to navigate from the dummy nodes to the coarse graph nodes.

10. The computer-implemented method of claim 1, wherein the low-level nodes of the low-level graph of the road network comprise one or more data tags that limit navigation in the gaming environment, the method further comprising performing a pre-pathfinding validation of the low-level nodes based on the data tags to confirm that a full route can be determined.

11. The computer-implemented method of claim 1, wherein one or more of the coarse graph nodes and the low-level nodes indicate traffic densities.

12. The computer-implemented method of claim 1, wherein said generating the coarse graph occurs during a build of the gaming environment.

13. A non-transitory nonvolatile computer program product comprising a processor-readable medium having a sequence of instructions stored thereon, which, when executed by the processor, causes the processor to execute virtual navigation, of one or more non-player characters, in a road network of a gaming environment, the road network of the gaming environment being represented by a low-level graph comprising one or more low-level nodes joined by links, the sequence of instructions comprising:
    instructions for generating, from the low-level graph of the road network of the gaming environment, a coarse graph of the road network of the gaming environment;
    instructions for determining, using the coarse graph of the road network of the gaming environment, a path from a start node to a target node, wherein the path comprises coarse graph nodes; and
    instructions for generating, from said path comprising coarse graph nodes, a full route from the start node to the target node, wherein the full route comprises low-level nodes.

14. The non-transitory nonvolatile computer program product of claim 13, wherein said instructions for generating the coarse graph comprises:
    instructions for selecting graph forks from the low-level nodes of the low-level graph of the road network, the graph forks representing those low-level nodes having two or more links to other low-level nodes;
    instructions for generating coarse graph nodes based on the selected graph forks;
    instructions for generating extra coarse graph nodes for each collection of nodes of the low-level nodes that do not include any graph forks and each collection of nodes of the low-level nodes that include graph forks having a circular path;
    instructions for generating links between the generated coarse graph nodes, the links including information stored in any link between the graph forks of the low-level nodes and the number of low-level nodes between the graph forks; and
    instructions for generating a reference table between the coarse graph and the low-level nodes.

15. The non-transitory nonvolatile computer program product of claim 13, further comprising instructions for generating additional dummy nodes that include no data and additional links for the dummy nodes.

16. A computer-based system for virtual navigation, of one or more non-player characters, in a road network of a gaming environment, the road network of the gaming environment being represented by a low-level graph comprising one or more low-level nodes joined by links, the system comprising:

- a server for managing the virtual navigation of the one or more non-player characters; and
- one or more player consoles in operable communication with the server over a network, each player console comprising a gaming platform for executing the gaming environment,
- wherein said server generates, from the low-level graph of the road network of the gaming environment, a coarse graph of the road network of the gaming environment, wherein said server determines, using the coarse graph of the road network of the gaming environment, a path from a start node to a target node, wherein the path comprises coarse graph nodes, and wherein said server generates, from said path comprising coarse graph nodes, a full route from the start node to the target node, wherein the full route comprises low-level nodes.

17. The system of claim 16, wherein said server further selects graph forks from the low-level nodes of the low-level graph of the road network, the graph forks representing those low-level nodes having two or more links to other low-level nodes, generates coarse graph nodes based on the selected graph forks, generates extra coarse graph nodes for each collection of nodes of the low-level nodes that do not include any graph forks and each collection of nodes of the low-level nodes that include graph forks having a circular path, generates links between the generated coarse graph nodes, the links including information stored in any link between the graph forks of the low-level nodes and the number of low-level nodes between the graph forks, and generates a reference table between the coarse graph and the low-level nodes.

18. The system of claim 17, wherein said server further generates additional dummy nodes that include no data and additional links for the dummy nodes.

19. The system of claim 18, wherein said server further copies data from the start node to a selected dummy node and copying data from the target node to a second dummy node.

20. The system of claim 16, wherein said server generates the coarse graph during a build of the gaming environment by the one or more player consoles.

\* \* \* \* \*